United States Patent
Kim et al.

(10) Patent No.: US 9,441,822 B2
(45) Date of Patent: Sep. 13, 2016

(54) COLOR OPTICAL PEN FOR ELECTRONIC PANEL

(71) Applicant: Samsung Electronics Co., Ltd., Suwon-Si, Gyeonggi-Do (KR)

(72) Inventors: Chang-jung Kim, Yongin-si (KR); In-kyeong Yoo, Yongin-si (KR); U-in Chung, Seoul (KR); I-hun Song, Hwaseong-si (KR); Seung-eon Ahn, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/924,944

(22) Filed: Jun. 24, 2013

(65) Prior Publication Data

US 2014/0133134 A1 May 15, 2014

(30) Foreign Application Priority Data

Nov. 9, 2012 (KR) ........................ 10-2012-0126943

(51) Int. Cl.
*B43K 29/10* (2006.01)
*F21V 23/00* (2015.01)
*G06F 3/0354* (2013.01)

(52) U.S. Cl.
CPC .......... *F21V 23/009* (2013.01); *G06F 3/03545* (2013.01)

(58) Field of Classification Search
CPC ........ G06F 3/03; G06F 3/033; F21V 23/009; B06F 3/03545
USPC .......................................... 345/179; 362/118
See application file for complete search history.

(56) References Cited

U.S. PATENT DOCUMENTS

| 5,489,900 | A | * | 2/1996 | Cali | ................. G01L 5/223 200/6 A |
|---|---|---|---|---|---|
| 5,959,616 | A | * | 9/1999 | Challener | ................ 345/179 |
| 6,654,008 | B2 | | 11/2003 | Ikeda et al. | |
| 7,649,527 | B2 | | 1/2010 | Cho et al. | |
| 2002/0080125 | A1 | | 6/2002 | Ikeda et al. | |
| 2005/0052435 | A1 | | 3/2005 | Cho et al. | |
| 2008/0066973 | A1 | * | 3/2008 | Furuki | ................. 178/19.04 |
| 2009/0146975 | A1 | * | 6/2009 | Chang | ..................... 345/179 |
| 2011/0007037 | A1 | | 1/2011 | Ogawa | |
| 2012/0268429 | A1 | * | 10/2012 | Lee et al. | ..................... 345/179 |
| 2013/0100022 | A1 | * | 4/2013 | Thompson et al. | .......... 345/163 |

(Continued)

FOREIGN PATENT DOCUMENTS

| JP | 08-137610 A | 5/1996 |
|---|---|---|
| JP | 2000-122809 A | 4/2000 |

(Continued)

*Primary Examiner* — Evan Dzierzynski
*Assistant Examiner* — Matthew Peerce
(74) *Attorney, Agent, or Firm* — Harness, Dickey & Pierce, P.L.C.

(57) ABSTRACT

A color optical pen includes a tip unit, a pen body unit attached to the tip unit; a pressure sensor that is disposed in the tip unit and configured to sense at least contact between a display unit of a terminal device and the tip unit; a light source that is disposed in the pen body unit and is configured to output light through the tip unit, if the pressure sensor senses the contact; a color selection switch that is disposed on the pen body, the color selection switch configured to select a color in response to operation by a user; and a driver configured to drive the light source at a frequency or pattern based on operation of the color selection switch.

7 Claims, 3 Drawing Sheets

(56) References Cited

U.S. PATENT DOCUMENTS

2013/0257823 A1* 10/2013 Chen .......................... 345/179
2013/0286033 A1* 10/2013 Mesaros et al. ............. 345/589

FOREIGN PATENT DOCUMENTS

| | | |
|---|---|---|
| JP | 2001-175404 A | 6/2001 |
| JP | 2004-086488 A | 3/2004 |
| JP | 2004-103042 A | 4/2004 |
| JP | 2005-135081 A | 5/2005 |
| JP | 2011-048660 A | 3/2011 |
| KR | 20040027590 A | 4/2004 |
| KR | 20060104315 A | 10/2006 |
| KR | 20100111530 A | 10/2010 |

* cited by examiner

COLOR OPTICAL PEN FOR ELECTRONIC PANEL

CROSS-REFERENCE TO RELATED APPLICATIONS

This application claims the benefit of Korean Patent Application No. 10-2012-0126943, filed on Nov. 9, 2012, in the Korean Intellectual Property Office, the disclosure of which is incorporated herein in its entirety by reference.

BACKGROUND

1. Field

The present disclosure relates to color pens for electronic panels, and more particularly, color optical pens for electronic panels, which provide user convenience.

2. Description of the Related Art

In general, in an electronic board or electronic blackboard, to write letters or to draw pictures in a color (e.g., red, blue, black, etc.), the color is designated through a menu and the designated color is represented on a screen. This designation procedure makes use of an electronic blackboard inconvenient for users relative to writing letters or drawing pictures on a conventional paper by using color writing instruments.

SUMMARY

In one or more example embodiments, color optical pens allow users to write letters or draw pictures in color on a display unit of a terminal device without a menu function, thereby increasing user convenience.

Additional aspects will be set forth in part in the description which follows and, in part, will be apparent from the description, or may be learned by practice of the presented embodiments.

According to an example embodiment, a color optical pen includes: a tip unit, a pen body unit attached to the tip unit; a pressure sensor that is disposed in the tip unit, the pressure sensor is configured to sense at least contact between a display unit of a terminal device and the tip unit; a light source that is disposed in the pen body unit , the light source configured to output light through the tip unit, if the pressure sensor senses the contact; a color selection switch that is disposed on the pen body, the color selection switch configured to select a color in response to an operation by a user; and a driver configured to drive the light source at a frequency or pattern based on operation of the color selection switch .

The light source and the driver may be disposed in the pen body unit.

The color optical pen may further include a lens unit that is disposed in the pen body unit, the lens unit being configured to focus the output light.

The lens unit may adjust a size of a beam of the output light.

The color selection switch may include a plurality of color selection switches configured to select different colors.

The plurality of color selection switches may include at least two of a black selection switch, a red selection switch, a green selection switch, and a blue selection switch.

At least two of the plurality of color selection switches may be configured to be selectable at a same time to implement more colors than a number of the plurality of color selection switches.

The color optical pen may further include an erasure selection switch for selecting an operation of erasing a letter written on a screen of the display unit or a picture drawn on the screen.

The erasure selection switch may be a button at an upper portion of the pen body unit.

The color selection switch may be configured to select the color in response to the user pressing the color selection switch.

Using a color optical pen according to an embodiment of the present invention, a user may write letters or draw pictures in color on a display unit of a terminal device without a menu function and may also select an erasure operation if necessary. Thus, the color optical pen according to example embodiments may provide a function such as color implementation and an erasure, thereby increasing user convenience.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, a color optical pen for an electronic panel will be described with regard to example embodiments with reference to the attached drawings. Throughout the present detailed description and claims, the expression "color" may mean black, and in some cases, may mean any color other than black. In addition, a line, which is drawn or erased by the color optical pen for an electronic panel according to an example embodiment, may mean a line with a thickness, a point, and an area. Furthermore, since an operation of writing a letter or drawing a picture is obtained as a result of an operation of drawing a line, hereinafter, the expression "draw a line" is used for convenience.

Figure 1:
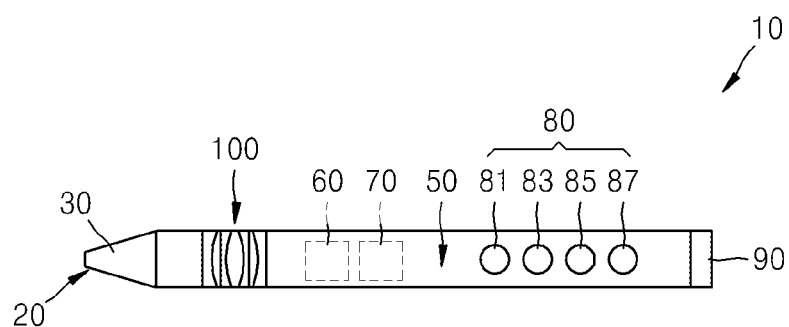
FIG. 1 is a diagram showing a color optical pen for an electronic panel, according to an example embodiment.
Figure 2:
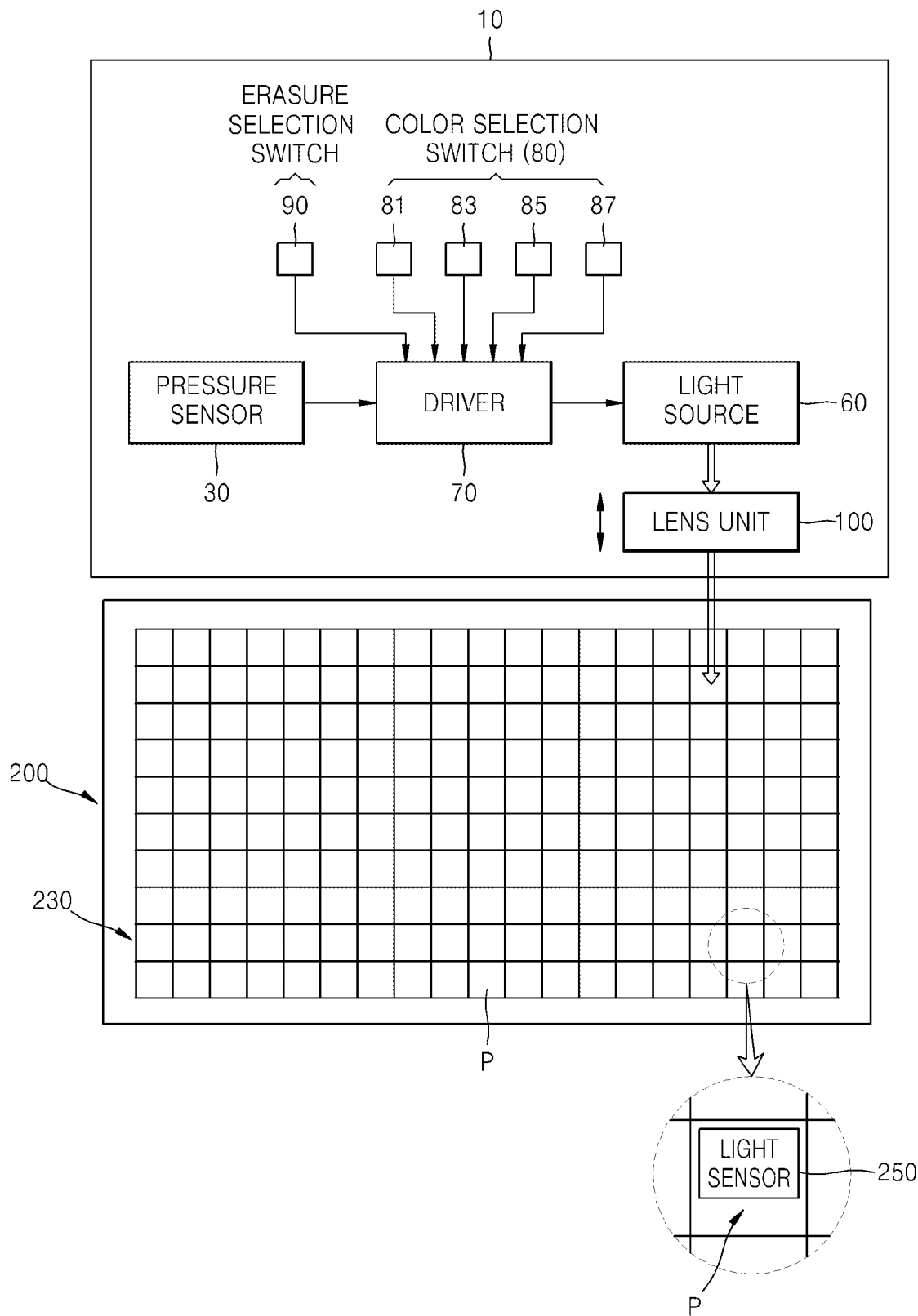
FIG. 2 is a basic block diagram of a system using a color optical pen for an electronic panel, according to an example embodiment.

FIG. 1 is a diagram showing a color optical pen 10 for an electronic panel, according to an example embodiment. FIG. 2 is a basic block diagram of a system using the color optical pen for an electronic panel according to an embodiment of the present invention. The electronic panel includes a terminal device having various display units, such as an electronic board, an electronic book, or a tablet.

Referring to FIGS. 1 and 2, a line that is drawn by the color optical pen 10 is displayed on a display unit 230 of a terminal device 200 according to pen attributes. These attributes may be previously set.

The color optical pen 10 includes a tip unit 20 and a pen body unit 50. The tip unit 20 includes a pressure sensor 30 for sensing a contact through a pressure when the tip unit 20 of the color optical pen 10 contacts the display unit 230 of the terminal device 200. A light source 60 and a driver 70 are disposed in the pen body unit 50. A lens unit 100 for focusing light that is output through the tip unit 20 may be further disposed in the pen body unit 50. A color selection switch 80 is disposed to be exposed to the outside of the pen body unit 50. An erasure selection switch 90 is disposed to be exposed to the outside of the pen body unit 50.

The pressure sensor 30 may include a piezoelectric material. A sensing signal of the pressure sensor 30 may be transmitted to the light source 60 or the driver 70. When a contact is sensed by the pressure sensor 30, the light source 60 is turned on in response to the sensing signal, and thus, light is output from the color optical pen 10. When the light source 60 is turned on and outputs light through the tip unit 20, the light may be emitted onto the display unit 230 of the terminal device 200.

A light-emitting device (LED) or a semiconductor laser may be used as the light source 60 to output light of which frequency, pattern, or shape (for example, a pulse shape and a pulse frequency) are modulated according to a modulation signal that is applied from the driver 70.

The driver 70 drives the light source 60 so that the frequency, pattern, or shape of light which is emitted from the light source 60 varies according to a color selected by a user to perform an operation of drawing a line with a color.

When a user operates the erasure selection switch 90, the driver 70 may drive the light source 60 so that the frequency, pattern, or shape of light which is emitted from the light source 60 becomes different from that when performing an operation of drawing a line with a color.

The color selection switch 80 may be disposed to be exposed to the outside of the pen body unit 50 so that a user may select a color to be used to write letters or draw pictures on the display unit 230 of the terminal device 200. The color selection switch 80 may include a plurality of color selection switches 81, 83, 85, and 87 to be selected for each color. The plurality of color selection switches 81, 83, 85, and 87 may have a form of buttons so that a color may be selected by pressing a corresponding color selection switch. As another example, the plurality of color selection switches 81, 83, 85, and 87 may be switches of the touch type, which are operated by a touch.

The plurality of color selection switches 81, 83, 85, and 87 may include, for example, at least two of a black selection switch 81, a red selection switch 83, a green selection switch 85, and a blue selection switch 87. The plurality of color selection switches 81, 83, 85, and 87 may include other switches to provide for the drawing of lines in more various colors.

The color optical pen 10 may be configured so that at least two of the plurality of color selection switches 81, 83, 85, and 87 may be selected at the same time. In this case, it is possible to implement more colors than the number of color selection switches 80 by a combination of the plurality of color selection switches 81, 83, 85, and 87.

Although in FIG. 1 the color optical pen 10 includes the black selection switch 81, the red selection switch 83, the green selection switch 85, and the blue selection switch 87, the color optical pen 10 may configured to include only two color selection switches and a color selection is performed according to the number of presses (touches) on a specific color selection switch. For example, one of the two color selection switches may be used as a black selection switch, and the other of the two color selection switches may be used as the specific color selection switch so that a selected color is changed according to the number of presses (touches) on the specific color selection switch. For example, the color optical pen 10 may configured to select any one of blue, green, and red according to the number of presses (touches) on the specific color selection switch. For example, the color optical pen 10 may be configured so that red is selected when pressing the specific color selection switch once, green is selected when pressing the specific color selection switch twice, and blue is selected when pressing the specific color selection switch three times.

The color optical pen 10 may further include the erasure selection switch 90 for partially or completely erasing a letter or a picture. The erasure selection switch 90 may be disposed to be exposed to the outside of the pen body unit 50. For example, the erasure selection switch 90 may have a form of a button at an upper portion of the pen body unit 50 as in FIG. 1. The erasure selection switch 90 may be configured to operate with a touch method.

The arrangement of the plurality of color selection switches 80 and the erasure selection switch 90 disposed to be exposed to the outside of the pen body unit 50 is not limited to FIG. 1, and may be variously changed.

The lens unit 100 included in the pen body unit 50 of the color optical pen 10 may be configured to adjust the size of a beam of light that is transmitted through the tip unit 20. For example, the lens unit 100 may include a plurality of lenses, and may adjust the size of a beam of light, which is emitted from the light source 60 and then outputs through the tip unit 20, by adjusting a relative location between at least one lens and the remaining lens. In addition, the pen body unit 50 may have a combination of two barrels that may be rotated, and may be configured so that a relative location between at least one lens and the remaining lens may be adjusted by the relative rotation of the two barrels, thereby adjusting the size of a beam of light that outputs through the tip unit 20. When the size of a beam of light that comes out through the tip unit 20 is adjusted, a line thickness may be adjusted when writing letters or drawing pictures on the display unit 230 of the terminal device 200, and thus, recording of narrow lines is possible.

Referring to FIG. 2, when the color optical pen 10 contacts the display unit 230 of the terminal device 200, light having a specific frequency, pattern, or shape is output from the color optical pen 10 by using a color selected by a user. Thus, the display unit 230 of the terminal device 200 may include a light sensor 250 that may sense the light having a specific frequency, pattern, or shape to write letters or draw pictures on the display unit 230. The light sensor 250 may be formed for each pixel or each sub-pixel unit, or may be formed for each unit that includes a plurality of pixels within a range in which a line drawn by the color optical pen 10 may be recognized.

By recognizing which color has been selected from information about the frequency, pattern, or shape of light that is sensed by the light sensor 250 or whether the current mode is an erasure mode, a line of the selected color is drawn on the display unit 230 according to the movement of the color optical pen 10 or an operation of erasing a line is performed.

For example, when the plurality of color selection switches 81, 83, 85, and 87 include the black selection switch 81, the red selection switch 83, the green selection switch 85, and the blue selection switch 87 as in FIG. 1, a driving current is inputted from the driver 70 to the light source 60 in a form of a direct current (DC) signal having a constant level when the black selection switch 81 is pressed, in a form of a single pulse wave when the red selection switch 83 is pressed, in a form of two continuous pulse waves when the green selection switch 85 is pressed, and in a form of three continuous pulse waves when the blue selection switch 87 is pressed. Thus, light having a frequency, pattern, or shape indicating a corresponding signal characteristic is emitted from the light source 60 and then is irradiated on the display unit 230 of the terminal device 200. The irradiated light is sensed by the light sensor 250, the light sensor 250 generates a sensing signal corresponding to the form of the driving current generated by the driver 70, and an operation of drawing a light with a corresponding color is performed on the display unit 230 of the terminal device 200 according to the sensing signal. For example, the terminal device 200 may include a processor (not shown) for controlling the display based on the input from the light sensor 250.

Figure 3:
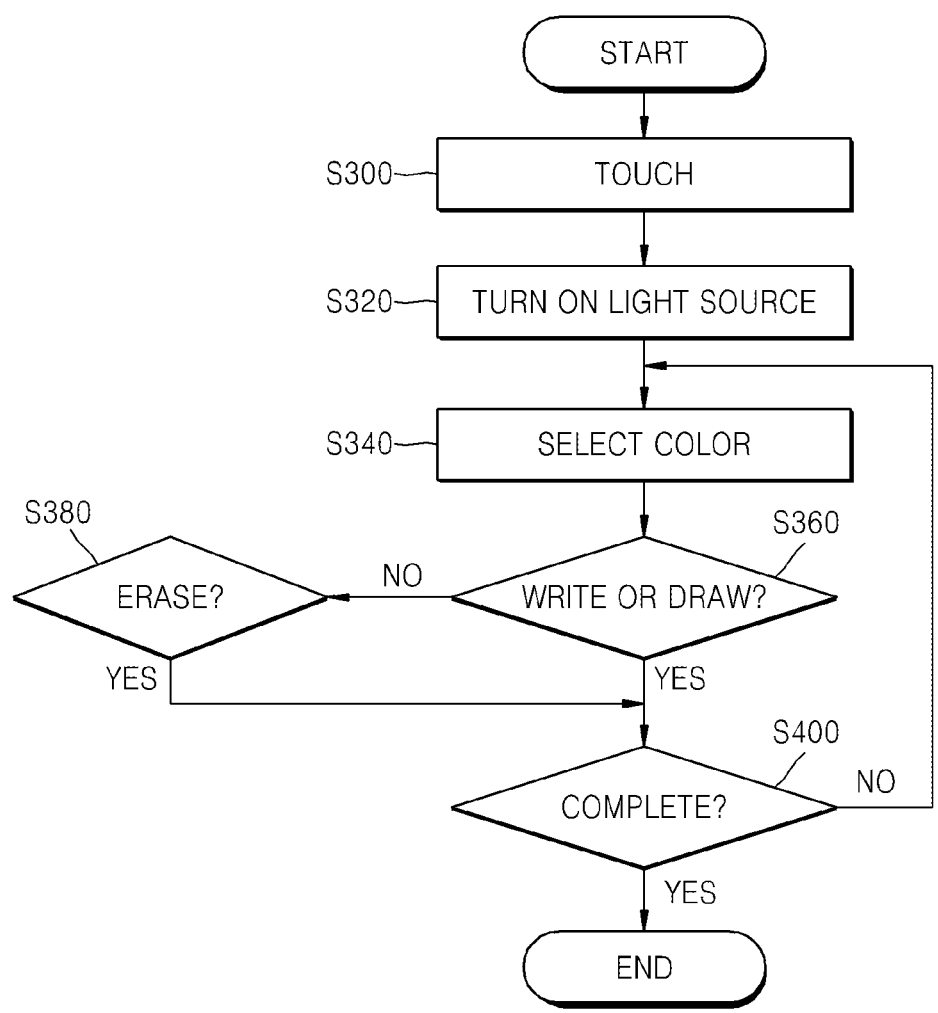
FIG. 3 is a flowchart illustrating an operation of a system using the color optical pen for an electronic panel, according to an example embodiment.

FIG. 3 is a flowchart illustrating an operation of a system using the color optical pen 10 for an electronic panel according to an example embodiment.

When the color optical pen 10 touches the display unit 230 of the terminal device 200 (operation S300), the light source 60 disposed in the color optical pen 10 is turned on (operation S320).

A color selection is performed when a user presses a desired color selection switch of the color optical pen 10 (operation S340), and light indicating information about a selected color is output through the tip unit 20 of the color optical pen 10 and is irradiated on the display unit 230 of the terminal device 200. Next, the information about the selected color is sensed by the light sensor 250, and an operation of drawing a line on the display unit 230 of the terminal device 200 by using the selected color is performed (operation S360). When it is desired to erase a portion of a drawn line or the whole drawn line, a user presses the erasure selection switch 90 of the color optical pen 10, and thus, an erasure operation is performed (operation S380).

When an operation of drawing a line with a specific color is completed or the erasure operation is completed, a drawing operation of the system is ended or an operation of selecting another color and drawing a line again is performed (operation S400).

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A color optical pen comprising:
    a tip unit;
    a pen body unit attached to the tip unit;
    a pressure sensor that is disposed in the tip unit, the pressure sensor configured to sense at least contact between a display unit of a terminal device and the tip unit;
    a light source that is disposed in the pen body unit, the light source configured to output light through the tip unit, if the pressure sensor senses the contact;
    a driver configured to drive the light source to emit the light of a selected color onto the display unit to instruct the display unit, via the light emitted therefrom, to draw a line thereon having the selected color of the light emitted thereto; and
    a plurality of color selection switches disposed on an exterior of the pen body, the plurality of color selection switches configured to instruct the driver to emit the light having the selected color, the selected color being selected by a user via the plurality of color selection switches, wherein
    the plurality of color selection switches are each associated with different ones of at least two colors such that,
        when a single one of the plurality color selection switches is selected, the light that is emitted has one of the at least two colors associated with a selected one of the plurality of color selection switches, and
        when at least two of the plurality of color selection switches are selected at a same time, the light that is emitted has a different color than the at least two colors such that more colors than a number of the plurality of color selection switches is emittable by the color optical pen.

2. The color optical pen of claim 1, wherein the light source and the driver are disposed in the pen body unit.

3. The color optical pen of claim 1, wherein the lens unit is configured to adjust a size of a beam of the output light.

4. The color optical pen of claim 1, wherein the plurality of color selection switches comprise:
    at least two of the following: a black selection switch, a red selection switch, a green selection switch, and a blue selection switch.

5. The color optical pen of claim 1, further comprising:
    an erasure selection switch configured to select an operation of erasing.

6. The color optical pen of claim 5, wherein the erasure selection switch is a button disposed at an upper portion of the pen body unit.

7. The color optical pen of claim 1, wherein the plurality of color selection switches are configured to select the selected color in response to the user pressing the color selection switch.

* * * * *